US008939492B2

(12) United States Patent
Gaudig et al.

(10) Patent No.: US 8,939,492 B2
(45) Date of Patent: Jan. 27, 2015

(54) STORAGE DEVICE AND PARTITION FOR USE IN SUCH A STORAGE DEVICE

(71) Applicant: Faurecia Innenraum Systeme GmbH, Hagenbach (DE)

(72) Inventors: Ralf Gaudig, Russelsheim (DE); Sebastian Wandtke, Heidelberg (DE); Martin Schulz, Karlsruhe (DE)

(73) Assignees: Faurecia Innenraum Systeme GmbH, Hagenbach (DE); Faurecia Interieur Industrie, Meru Cedex (FR)

( * ) Notice: Subject to any disclaimer, the term of this patent is extended or adjusted under 35 U.S.C. 154(b) by 0 days.

(21) Appl. No.: 13/728,542

(22) Filed: Dec. 27, 2012

(65) Prior Publication Data

US 2013/0214549 A1  Aug. 22, 2013

Related U.S. Application Data

(63) Continuation of application No. PCT/EP2011/003237, filed on Jun. 30, 2011.

(30) Foreign Application Priority Data

Jun. 30, 2010 (DE) .......... 10 2010 025 624
Jun. 30, 2010 (DE) .......... 10 2010 025 625

(51) Int. Cl.
*B60N 3/10* (2006.01)
*B60R 7/00* (2006.01)
*B60R 7/04* (2006.01)
*F16B 5/00* (2006.01)

(52) U.S. Cl.
CPC ............. *B60R 7/005* (2013.01); *B60N 3/108* (2013.01); *B60R 7/04* (2013.01); *F16B 5/00* (2013.01)
USPC ........................ 296/37.8; 296/1.07

(58) Field of Classification Search
USPC ........... 296/37.8, 37.12, 37.13, 37.14, 37.15, 296/37.16, 1.07; 403/291; 224/483; 248/311.2
See application file for complete search history.

(56) References Cited

U.S. PATENT DOCUMENTS 5,170,980 A * 12/1992 Burrows et al. ............ 248/311.2
5,474,272 A * 12/1995 Thompson et al. ........ 248/311.2
5,921,519 A    7/1999 Dexter et al.
6,264,154 B1 * 7/2001 Hiscox et al. .............. 248/313

(Continued)

FOREIGN PATENT DOCUMENTS

DE     9403833 U1      5/1994
DE     9403833 U1 *    5/1994
DE  10200618895 A1    11/2006
GB     2425293 A      10/2006

(Continued)

OTHER PUBLICATIONS

European Patent Office, International Searching Authority, "International Preliminary Report on Patentability and Written Opinion" mailed Jan. 8, 2013; International Appln. No. PCT/EP2011/003237, filed Jun. 30, 2011.

*Primary Examiner* — Jason S. Morrow
*Assistant Examiner* — E Turner Hicks
(74) *Attorney, Agent, or Firm* — Ingrassia Fisher & Lorenz, P.C.

(57) ABSTRACT

A storage device for use in the passenger compartment of a vehicle is provided herein. The storage device has a partition that can divide a receptacle space of the storage device into partial receptacle spaces and an overload safety that prevents the partition from being destroyed or damaged under the influence of excessive force.

14 Claims, 15 Drawing Sheets

(56) References Cited

U.S. PATENT DOCUMENTS

| | | |
|---|---|---|
| 6,427,605 B1 | 8/2002 | Heine et al. |
| 8,286,844 B2 | 10/2012 | Rampf |
| 2012/0138649 A1* | 6/2012 | Kreis ............................ 224/483 |

FOREIGN PATENT DOCUMENTS

| | | | |
|---|---|---|---|
| GB | 2466355 A | * | 6/2010 |
| JP | 10024770 A | | 1/1998 |
| JP | 2001171416 A | * | 6/2001 |

* cited by examiner

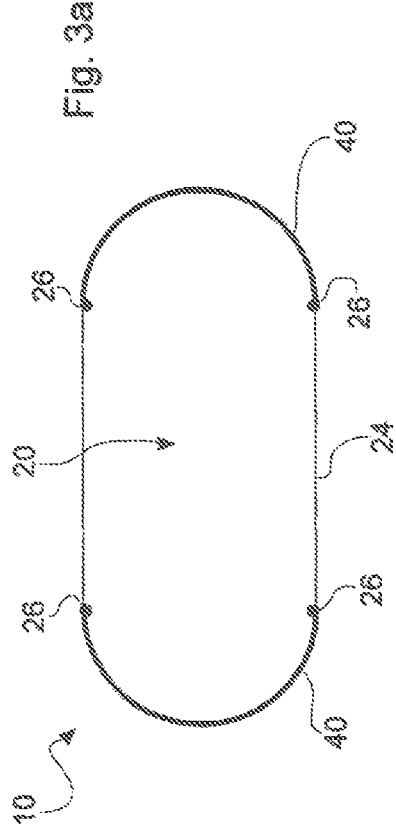
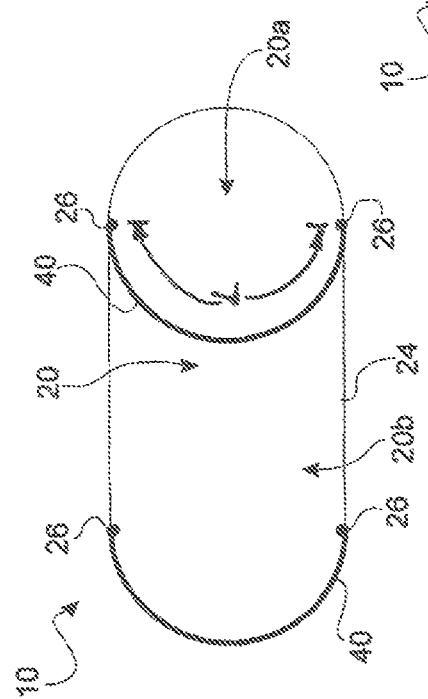
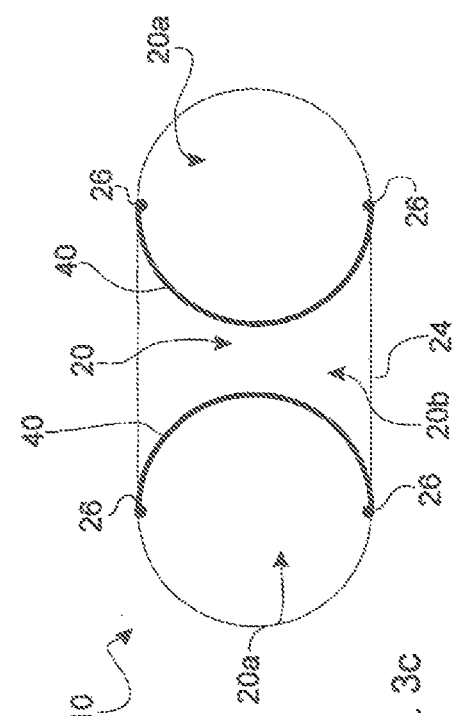

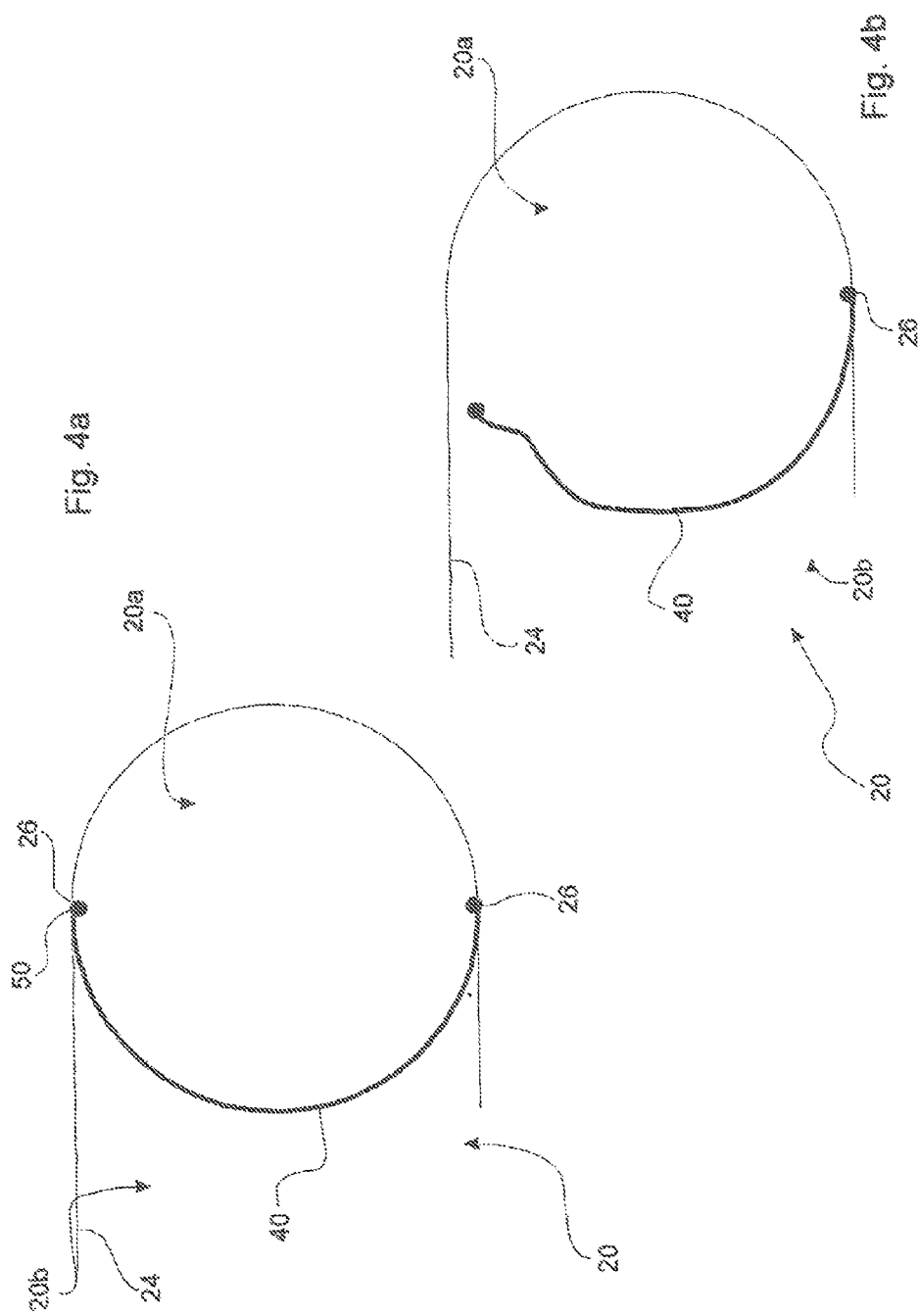

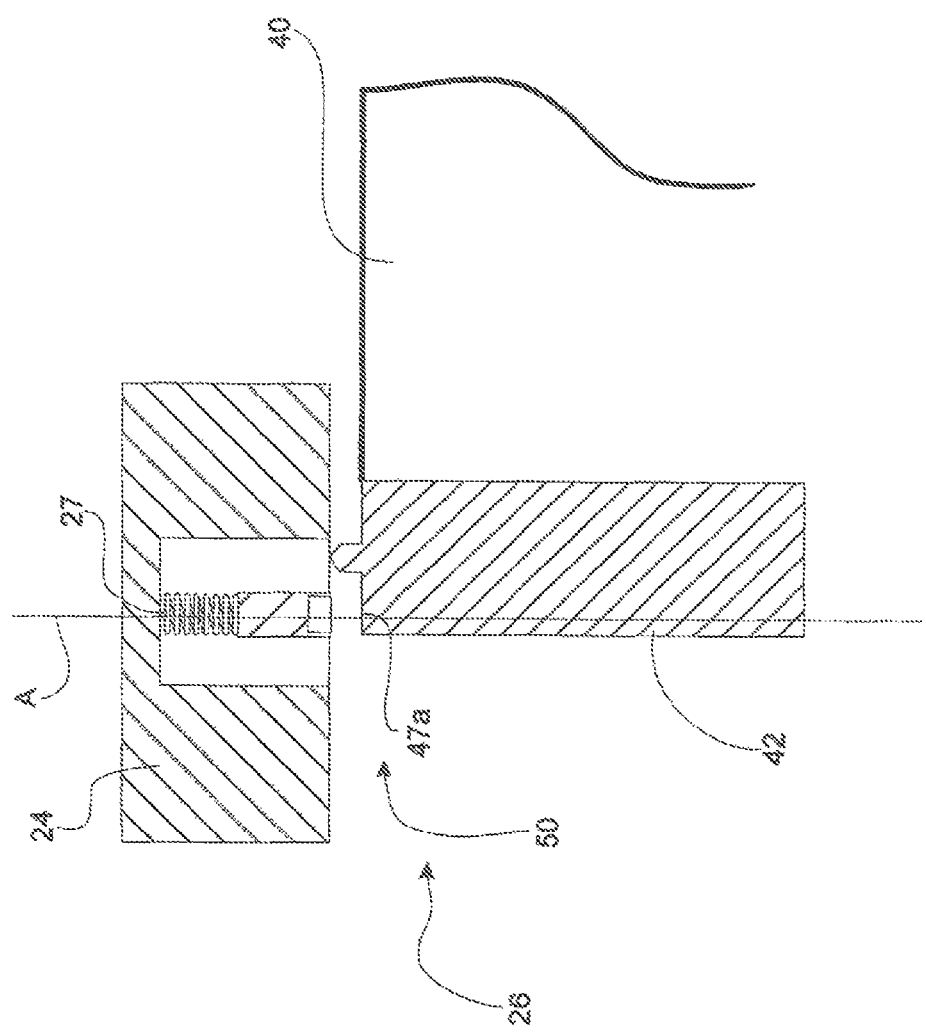

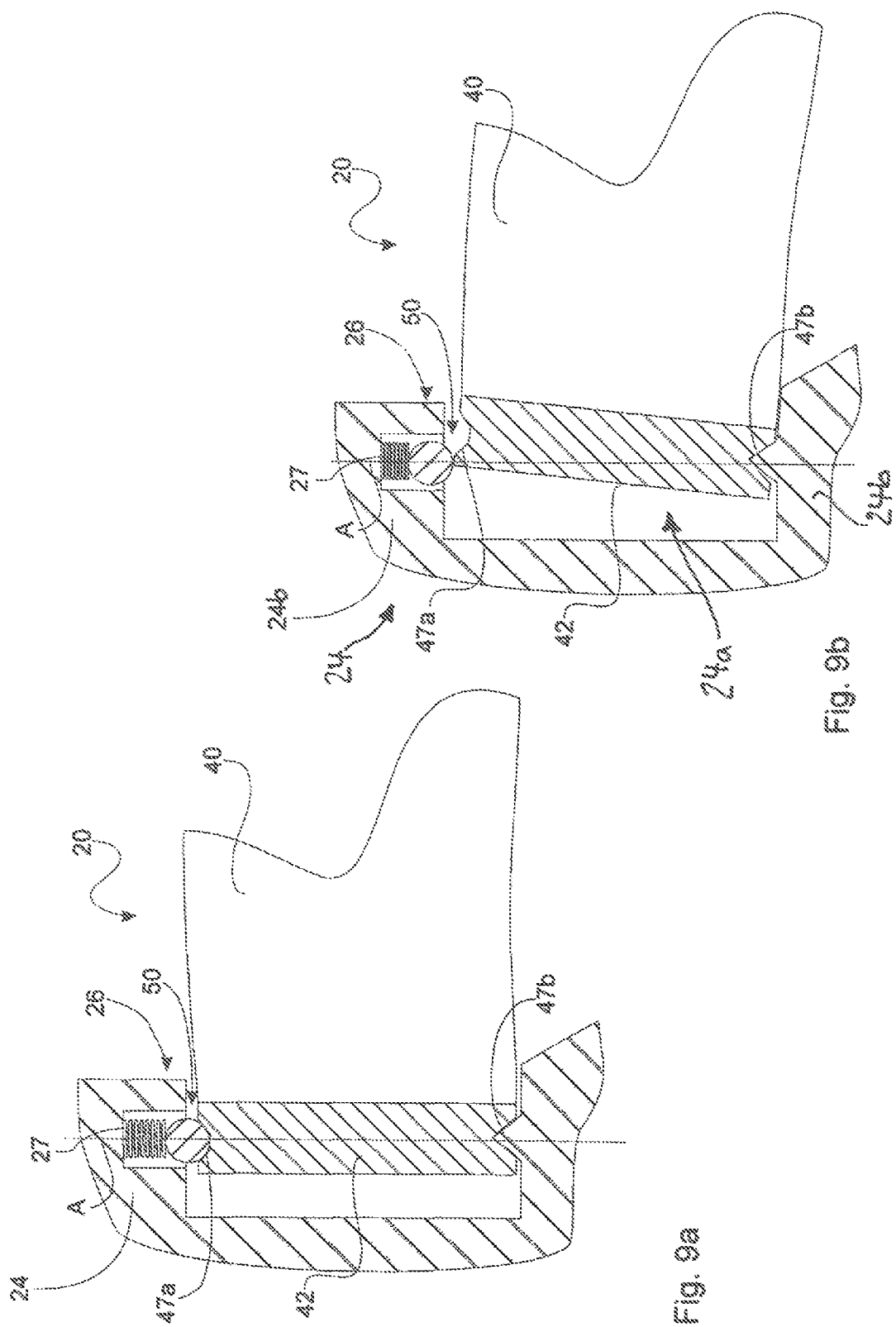

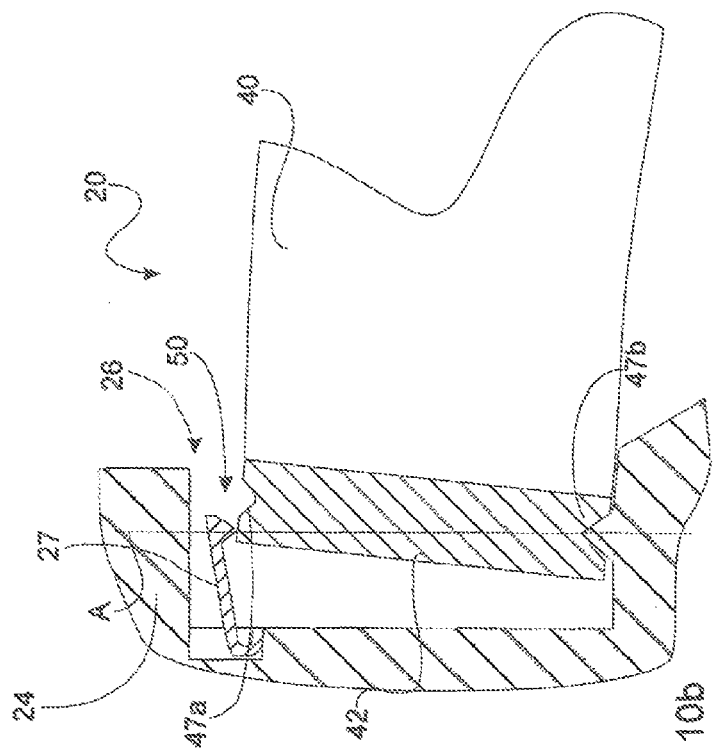
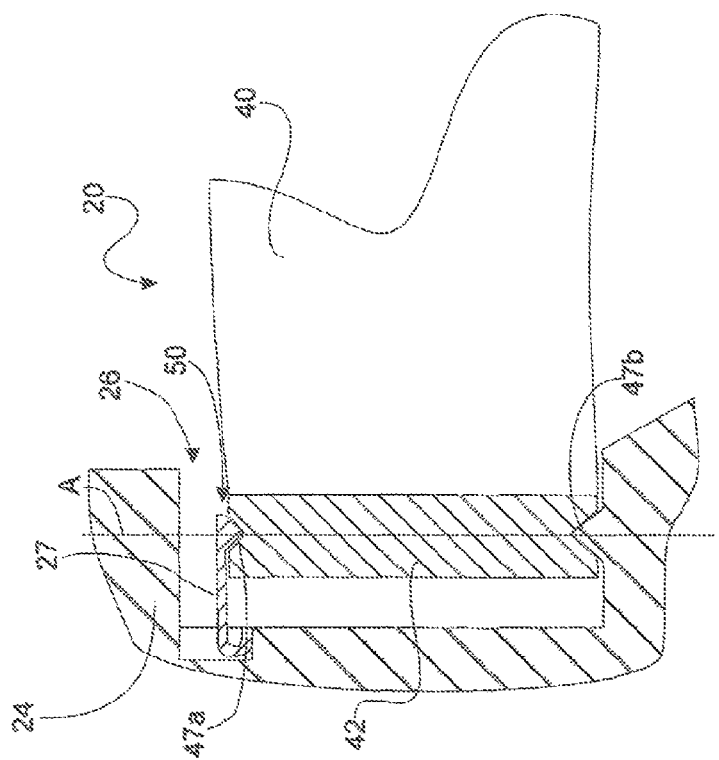

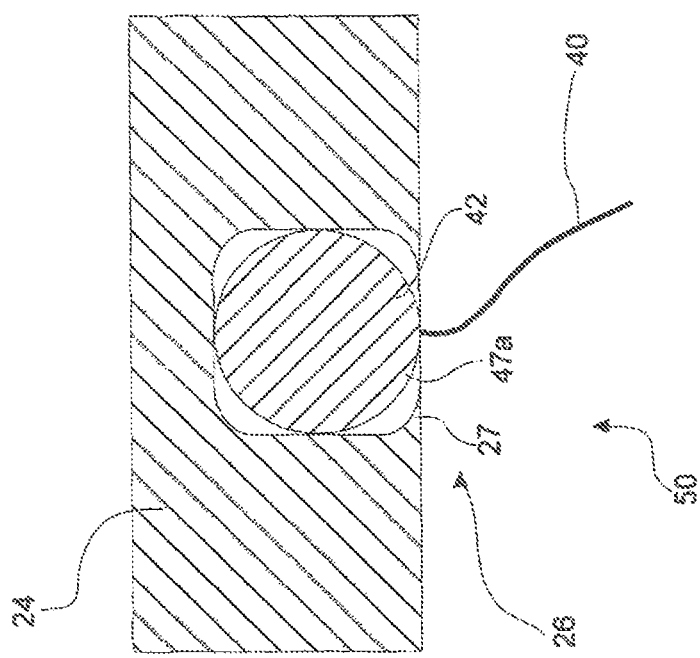

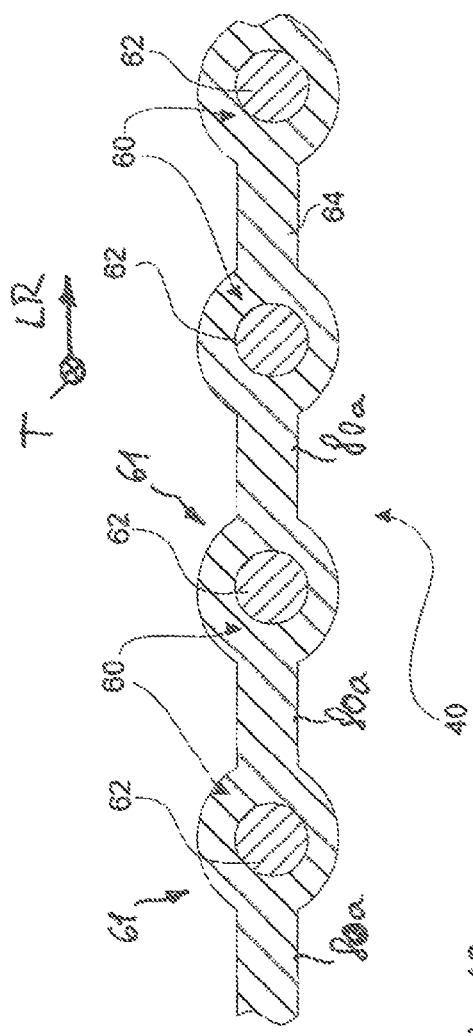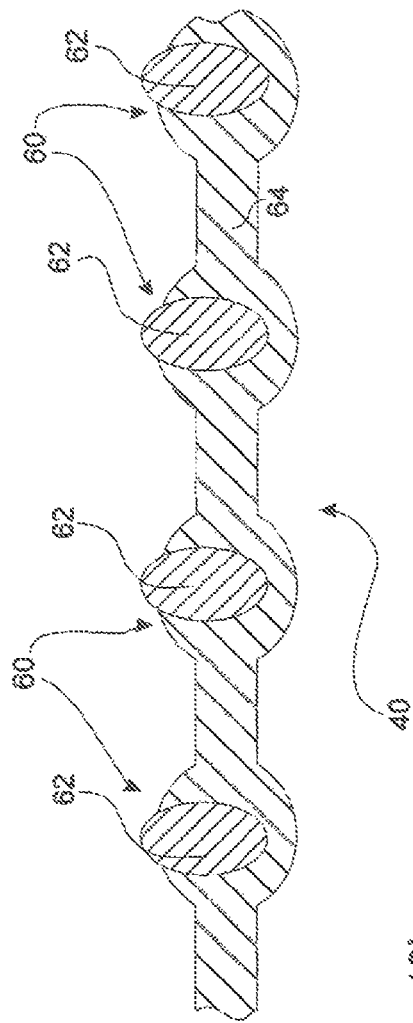
Fig. 13a
Fig. 13b

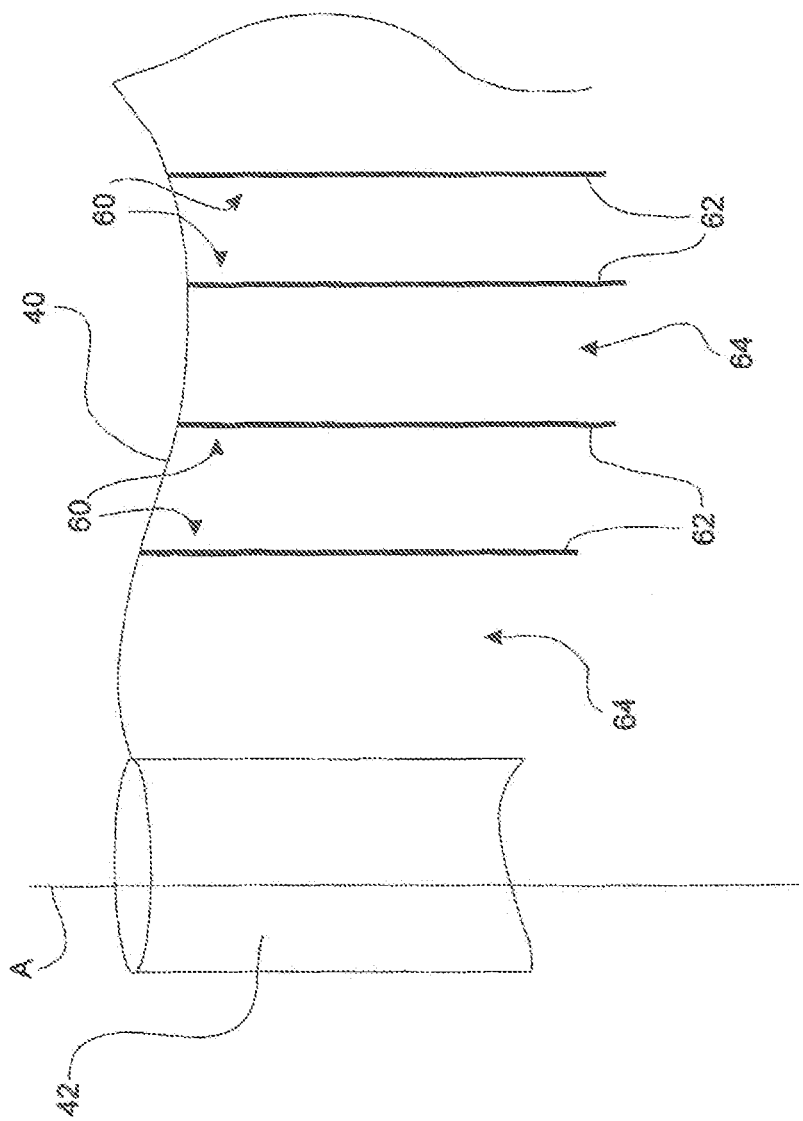

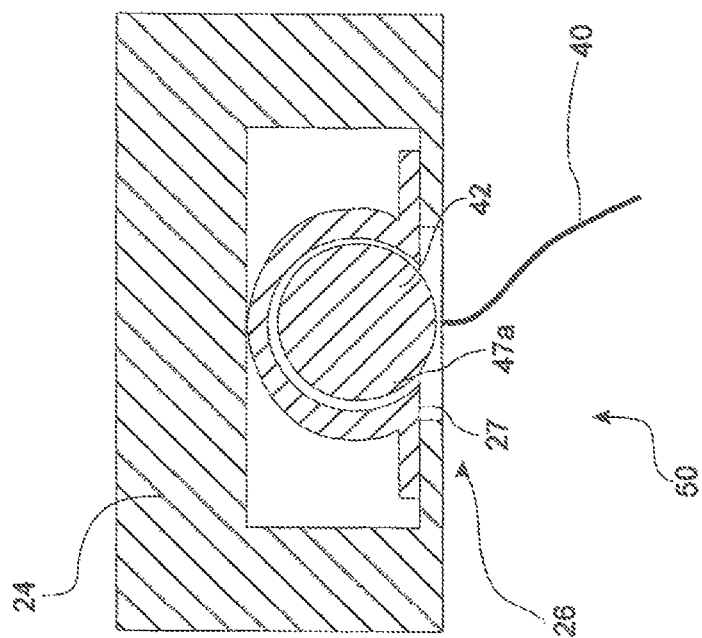

STORAGE DEVICE AND PARTITION FOR USE IN SUCH A STORAGE DEVICE

CROSS-REFERENCE TO RELATED APPLICATION

This is a continuation application claiming priority to International Application No. PCT/EP2011/003237, filed Jun. 30, 2011, which was published under PCT Article 21(2) and which claims priority to German Application No. 102010025624.2, filed Jun. 30, 2010 and German Application No. 102010025625.0 filed Jun. 30, 2010, which are all hereby incorporated in their entirety by reference.

TECHNICAL FIELD

The technical field pertains to a storage device, in particular, for use in the passenger compartment of a motor vehicle and a partition for use in such a storage device.

BACKGROUND

Storage devices of this type are known from the general prior art. They are used, for example, in motor vehicles for storing small utensils such as, for example, keys, pens or reproduction mediums like CDs while driving. Such storage devices are also used as beverage holders for accommodating and, in particular, holding bottles, cans or other types of beverage containers. In this case, elaborate mechanical components that are adapted to a defined cup size or bottle size or can size are typically used for holding the beverages. Small partition systems are frequently provided in storage devices for small utensils. Although it was already proposed to provide flexible partitions that make it possible, for example, to divide a receptacle space in different ways by arranging the partitions in different positions, all known storage devices either operate with conspicuous complex mechanisms or the flexible partitions may be destroyed during their use, particularly during the change between different configurations. The latter may occur due to the fact that the change between different configurations is carried out by the user of the motor vehicle and the force applied by the user does not necessarily remain within a predefined maximum force during the repositioning of the partition. The user of a motor vehicle equipped with such a storage device receives damages to or the destruction of such a partition to be caused by the poor quality of the storage device and therefore the entire motor vehicle.

It is desirable to solve the above-described problems of known storage devices. The various embodiments disclosed herein aim, in particular, to make available a storage device that can be flexibly adapted to different operating situations and furthermore has a long service life.

The above-defined objective is attained with a storage device with the characteristics of the independent claims. Advantageous embodiments are disclosed in the dependent claims that refer to these independent claims.

SUMMARY

According to an embodiment, a storage device, in particular, with a bottom surface, an inner wall that forms a receptacle space together with said bottom surface and at least two bearing devices arranged in the inner wall is proposed. The storage device features:

at least one panel-shaped and elastic partition that is connected to the inner wall in the bearing devices of the inner wall on two oppositely positioned lateral edge sections such that the bearing axis is formed, wherein the position of the bearing devices is chosen and the partition is realized in such a way that the partition can assume at least two stable deformation states with at least sectionally opposing curvature profiles in order to divide the receptacle space of the storage device into partial receptacle spaces, and at least one overload safety for the arrangement of the partition in the storage device, wherein the overload safety is realized in such a way that it releases at least one of the lateral edge sections from the corresponding bearing device when the partition exerts a predefined force upon at least one bearing device.

One embodiment of the inventive storage device for use in the passenger compartment of a motor vehicle features a receptacle space that is defined by a bottom surface and an inner wall with at least two bearing devices. In this case, the shape of the bottom surface and the inner walls is basically irrelevant. For example, the bottom surface may be essentially realized in a planar fashion, but it is also conceivable that arched bottom surfaces or curved bottom surfaces are adapted to specific operating situations in a motor vehicle. The inner wall may advantageously extend essentially perpendicular to the bottom surface. However, the inner wall may also have one or more curvatures in order to realize more complex geometries of the receptacle space and therefore the storage device. At least two bearing devices are provided in the inner wall and advantageously extend over the entire length of the inner wall from the bottom surface. However, it would also be possible that the bearing devices only extend over part of the height of the inner wall.

An inventive storage device furthermore features at least one the panel-shaped elastic partition that is supported in an articulated fashion in the bearing devices of the inner wall on two oppositely positioned longitudinal edges such that one respective bearing axis is formed. In other words, a panel-shaped and elastic partition is provided and, due to the articulated support in the bearing devices, accommodated such that it can be moved between different positions within the receptacle space. In this context, a panel-shaped and elastic partition refers to a partition, the extension of which in a longitudinal and a transverse direction is much greater than its thickness. Consequently, a panel-shaped partition may also be realized in a foil-like fashion or with a thin sheet metal. The term "elastic" refers to the partition comprises a component that can be deformed elastically, i.e., flexibly. During a deformation of the partition, the elasticity generates restoring forces in the material thereof which seek to once again return the partition into its original, undeformed shape. In the context of the present invention, elasticity therefore refers to the combination of flexibility and restoring forces of the partition.

Furthermore, the position of the bearing devices of an inventive storage device is chosen such that the partition can be reversibly deformed between at least two stable deformation states in such a way that the partition has a first curvature in a first stable deformation state and the partition has a second curvature that at least sectionally opposes the first curvature in a second stable deformation state. In other words, the partition can snap back and forth between the two stable deformation states. The deformation states between the at least two stable deformation states therefore are unstable deformation states, in which the partition seeks to assume one or the other stable deformation state depending on the exact position of the unstable deformation state. The stable deformation states therefore are situations, in which an equilibrium of forces exists between the restoring forces in the elastic partition and the bearing forces that are absorbed by means of the bearing devices.

With respect to their arrangement, as well as the geometric dimensions of the partition, the bearing devices are realized such that the partition extends between the two bearing devices in such a way that the receptacle space is divided into separated partial receptacle spaces by the partition in at least one deformation state thereof. This means that an overall receptacle space of the storage device contains different partial receptacle spaces that are separated from one another by the partition in at least one of the two stable deformation states. The partition may be complete, i.e., it may begin at the bottom surface. However, the partition may also be incomplete, i.e., it does not begin at the bottom surface and/or does not extend up to the upper end of the inner wall. With respect to the storage of small utensils, it is advantageous if the geometric extension of the partition already begins flush with the bottom surface. This prevents small utensils from sliding through underneath the partition and therefore also effectively separates the partial receptacle spaces from one another for small utensils. With respect to the storage of larger utensils such as, for example, beverage containers like bottles or cans, however, it may suffice to provide smaller elastic partitions that do not extend directly from the bottom surface such that an intermediate space remains between the partition and the bottom surface of the receptacle space.

It should furthermore be noted that at least one of the two stable deformation states causes a separation into two partial receptacle spaces. For example, it would be conceivable that the second stable deformation state is in special operating situations realized such that the partition flatly adjoins the inner wall at least sectionally in this deformation state. A partition that flatly adjoins the inner wall, if applicable, over the entire geometric extension of the panel-shaped partition may be advantageous, in particular, in large receptacle spaces because the partition makes available the entire volume of the receptacle space in such a deformation state. Consequently, the user of the storage device can freely choose whether to have available the entire receptacle space or only a partial receptacle space. The flexibility of use therefore is not restricted to partial receptacle spaces of different sizes, but rather also offers an overall receptacle space that can be actively divided.

An overload safety for the partition is furthermore provided in an inventive storage device, wherein said overload safety is realized in such a way that it releases at least one of the longitudinal edges from the corresponding bearing device when a predefined bearing force exerted upon the at least one bearing device by the partition is exceeded. In other words, stresses in the partition that are caused by elastic restoring forces on the one hand and by the absorption of retaining forces by means of the bearing devices, for example, when beverage containers are accommodated in the partial receptacle spaces on the other hand cannot lead to damages to the partition. The stresses in the partition are absorbed by means of the bearing devices in the form of bearing forces and generate corresponding opposing forces such that the opposing force in the bearing counteract the bearing force exerted by the partition. The stable deformation state is ultimately achieved due to this equilibrium of forces. In this case, the predefined bearing force exerted upon the at least one bearing device by the partition depends on the material parameters of the partition, as well as its geometry, but a dependence on the speed and/or other ambient parameters during the deformation between the two stable deformation states is also decisive in this respect. The overload safety may be preset to a fixed value or adjustably predefine the bearing force to be exceeded in order to release at least one of the longitudinal edges from the corresponding bearing device.

In the context of an embodiment, it is preferred that at least one of the longitudinal edges is completely released from the corresponding bearing device. In other words, the stress/tension in the partition is essentially reduced to zero after the release. The elastic restoring forces in the partition move the partition into a position, in which its material is unstressed. The stresses in the material therefore are limited to a permissible maximum of the predefined bearing force that the partition exerts upon the at least one bearing device and this predefined bearing force is advantageously limited to a value that is no higher than the stress limit of the material of the partition. However, a certain safety margin is provided, in particular, between the predefined bearing force and the maximum stability of the material of the partition under loads. For example, it may be advantageous to realize the safety margin such that the predefined bearing force, i.e., the force at which the overload safety is triggered, amounts to 50%, 60%, 70%, 80% or up to 90% of the maximum stability of the material of the partition under loads.

The release of the overload safety may take place in a reversible fashion. The user or a skilled workshop employee therefore is able to reinsert one of the longitudinal edges of the partition into the bearing device after its release. However, two technical prerequisites need to be fulfilled in order to realize this reversibility of the release. It needs to be ensured that a reinsertion of the bearing edge is even possible with respect to mechanical and, in particular, geometrical considerations. A reversible embodiment furthermore requires that neither the overload safety nor the longitudinal edges nor the bearing edges are affected by the release, i.e., that these components remain undamaged.

The overload safety itself may form part of the bearing device or be realized separately thereof. The overload safety therefore should be interpreted as a function that can be partially fulfilled by the bearing device, but also by other additional elements. One such additional element could comprise, for example, the longitudinal edge that is realized accordingly in this case.

The expression "opposed orientation of the first curvature referred to the second curvature" means that the curvatures extend in different directions and, in particular, have different orientations. With single curvatures, in particular, it is advantageous if the partition is curved in a convex fashion in the first deformation state and curved in a concave fashion in the second stable deformation state. In this case, the value of the curvature is basically irrelevant. It would be possible, for example, that the concave curvature has a significantly smaller curvature radius than the convex curvature or vice versa. However, it may be advantageous if both curvatures have essentially the same value, but with different signs. In other words, the "curvature radius" in the convex direction in one deformation state is identical to the curvature in the concave direction in the other stable deformation state. When accommodating round utensils as it is the case with most beverage containers, in particular, this makes it possible to realize a storage device, the extended partition of which has a curvature that accommodates the curvature of the inner wall of the corresponding partial receptacle space. In other words, a partial receptacle space that has an essentially circular cross-sectional design can be created in this way. Such a circular receptacle allows an improved accommodation of utensils such as, for example, beverage containers of round cross section.

The predefined bearing force for the overload safety should, in particular, be higher than 50N, for example in the range between 50 and 100N, in order to prevent the quality of the storage device from deteriorating due to premature and therefore excessively frequent triggering of the overload safety.

It should furthermore be noted that the elasticity of the material of the partition is advantageously based on a lower flexural rigidity of the partition in at least one longitudinal direction along the bearing axis. In this case, at least a reduced extensibility is realized in the transverse direction of the partition that extends perpendicular to the longitudinal direction defined by the bearing axes in order to ensure that the two stable deformation states are neither reversibly or irreversibly changed due to an extension of the partition. However, a slight extension may be advantageous in order to clamp beverage utensils in a partial receptacle space. In this case, the partition is extended along its transverse direction, i.e., perpendicular to the bearing axes, when the small utensils or the beverage containers are inserted into the partial receptacle space such that it exerts a retention force in the form of a frictional force between the partition and the beverage container upon this beverage container.

It may furthermore be advantageous if the overload safety is realized in such a way that an overload of the material of the partition is prevented at the beginning, during or at the end of the movement of the partition between the first stable deformation state and the second stable deformation state. In this context, overload safety refers to preventing excessive wear or even damages to or the destruction of the partition. Wear also occurs due to excessively high material stresses that change the structure within the material of the partition. This does not necessarily have to result in immediately visible damages to the partition. In fact, structural changes furthermore must be prevented from reducing the service life of the partition, i.e., its functional period or its operating period or the number of possible alternating cycles between the stable deformation states. Naturally, the overload safety should in any case prevent a situation that would result in tearing or the complete destruction of the partition. In this respect, the overload safety is realized, in particular, in such a way that this is not only the case in the end positions, i.e., in the at least two stable deformation states, but also during the movement between these stable deformation states.

In an embodiment, it is advantageous if the overload safety of the storage device is at least partially formed by at least one correspondingly designed bearing device and one correspondingly designed longitudinal edge of the partition. This means that the overload safety may comprise two components in order to fulfill its function. It may fulfill its function due to the interaction between bearing device and longitudinal edge. This makes it possible to realize the overload safety in the form of an interaction between longitudinal edges of the partition and the bearing device itself. Due to their corresponding design as an overload safety, the bearing device, as well as the longitudinal edge, make other components of an overload safety unnecessary such that the complexity and therefore also the costs of an inventive storage device are additionally reduced. In this respect, it suffices to release at least one of the two longitudinal edges such that it is also sufficient to adapt a single longitudinal edge of the partition and a single bearing device of corresponding design. This reduces the complexity of the storage device even further such that the manufacture and the costs are additionally optimized.

It may furthermore be advantageous if at least one bearing device of the storage device features at least one spring element that can be moved against a spring force and corresponds to a catch element of the longitudinal edges of the partition in such a way that the catch element is in the engaged state thereof held in the bearing device in an articulated fashion by the spring element and the spring element is moved against the spring force such that the catch element is released when a defined bearing force is exceeded. In other words, the overload safety is realized due to an interaction between the bearing device and the longitudinal edges. This is achieved, in particular, with the two functional elements of the spring element of the bearing device and of the catch element of the longitudinal edges of the partition. These elements communicate with one another such that it is possible to release the catch element and therefore the longitudinal edge with respect to the spring force. In this context, the direction, in which the spring element and therefore the spring force acts, is irrelevant in a first step. It would be possible to exert spring forces in the axial direction of the bearing axis, as well as to provide spring elements that exert a spring force independently of the bearing axis, for example, transverse to the bearing axis.

In this case, the spring element may have different geometric shapes and be realized, for example, in a spherical or lug-shaped fashion, particularly conical. The catch element of the longitudinal edges of the partition corresponds to the spring element, particularly to its geometric shape. It may be realized, for example, in the form of a lug or a depression that corresponds to the spring element. If the protruding spring element is designed, for example, in the form of a sphere or a lug, the catch element of the longitudinal edges of the partition is advantageously realized in the form of a depression with a contour that more or less correlates with the spring element. In this way, the spring element can engage into the catch element such that the spring force holds the spring element in the desired engaged position in the catch element. However, the reversed configuration, i.e., a recessed design of the spring element and a protruding design of the catch element, is also conceivable within the scope of the various embodiments disclosed herein.

It is also possible that the spring element forms a restraint of sorts for the bearing edge. Peripheral restraints around the circumferential direction of the round cross section of the longitudinal edge may be advantageous, in particular, for longitudinal edges of the partition that have an essentially round cross section. Some of these peripheral bearing devices may be sectionally equipped with springable regions such that an opening of the bearing device remains, through which not only the longitudinal edge of the partition can be installed, but the longitudinal edge in the form of an overload safety can also be released again. In such an instance, the spring elements in the form of the release projections of such a bearing device are effective for an installation surmounting force, as well as a predefined bearing force of the overload safety, i.e., the overload force.

It is furthermore irrelevant whether the spring force is made available by the spring element itself, i.e., by an integral design of a force-exerting part and the spring element, or a separate spring or springable element is provided.

It is advantageous if the overload safety of an inventive storage device features a first catch element that corresponds to the spring element of the overload safety on one end of at least one longitudinal edge of the partition referred to the longitudinal axis and a second catch element that corresponds to an abutment in the form of a corresponding catch mechanism of the bearing device on its other end such that the second catch element is also automatically released during the release of the first catch element, i.e., the entire longitudinal edge of the partition is released. In other words, this embodiment concerns a technical concept that reduces the total number of components and therefore optimizes the complexity and the costs of the storage device. Active elements such as the spring element only need to be provided on one end of the longitudinal edge of the partition while a passive element, i.e., an element that responds to the active element, is provided on the other side of the longitudinal edge of the partition. In other words, this makes it possible for the spring element of the overload safety to release the first catch element from the spring element such that the longitudinal edge is/can be moved into a position, in which the longitudinal edge can also be released from the second catch element. In this case, the second catch element is realized, for example, in the form of a lug or in the form of a depression that corresponds to a corresponding depression or lug of the bearing device. The release of the longitudinal edge from the first catch element causes the longitudinal edge to move into a position, in which it is no longer pressed against the lug or depression on the lower end of the longitudinal edge by the spring force. The longitudinal edge therefore is released and can freely move away from the bearing device.

In the bearing situation, the longitudinal edge consequently is clamped relative to the first catch element between the upper and lower end of the respective bearing device, particularly between the depression or lug underneath the second catch element and the spring element, and therefore supported in an articulated fashion.

In this case, the spring element may be realized in different ways. In addition to a design in the form of a sphere or lug that presses against a spring or is made of an elastic material, it would also be conceivable to provide a spiral spring, i.e., a spring that is subjected to bending moments. Such a spiral spring in a manner of speaking makes it possible to reorient the spring forces such that the overall height of the bearing device and therefore the overall height of the storage device are reduced to a minimum. The flexibility of use of an inventive storage device is further broadened in this way.

The spring element may be advantageously realized in such a way that it can be moved perpendicular to the bearing axis against a spring force. The realization of the spring element in the form of a movement perpendicular to the longitudinal axis against a spring force provides the advantage that no structural space is required above and underneath the longitudinal edge of the partition for the implementation of the overload safety. This reduces the structural height of the overall concept of the storage device and the flexibility is further broadened.

Depending on the operating situation, however, it would also be conceivable that the spring element of an inventive storage device can be advantageously displaced along the longitudinal axis against a spring force.

This allows a particularly simple construction that is optimized, in particular, with respect to the fault liability. A spring force that acts perpendicular to the bearing axis not only makes it possible to install the spring or the spring element in a particularly simple fashion, but the release against such a spring force is also ensured in a particularly reliable fashion because it is not necessary to reorient the bearing force.

It may also be advantageous if at least one bearing device of an inventive storage device and the overload safety are at least partially realized in an integral fashion. The integral embodiment in the form of an advantageous design with functional integration, in which parts of the bearing device simultaneously form the overload safety, reduces the number of components and therefore the complexity of the entire storage device. Cost savings are achieved due to the compact design and the reduction of components.

The integral design can be realized, for example, by means of a special contour adaptation of the bearing devices or by means of an overload safety that simultaneously fulfills the bearing function. This can be achieved, for example, with spring elements that are sufficiently strong for generating bearing forces that allow the articulated support and the geometric shape of which furthermore allows the release of the correspondingly supported longitudinal edge in the form of an overload safety. In a manner of speaking, a functional union between the bearing device and at least part of the overload safety is realized in one and the same components.

It may furthermore be advantageous if the partition of an inventive storage device at least sectionally adjoins the inner wall in a first stable deformation state. If the partition sectionally adjoins the inner wall, it is advantageous that the partition is practically unapparent to the user of the storage device in such a stable deformation state. Practically the entire exposed receptacle space of the storage device is available in this case. The user therefore can choose between one large overall receptacle space and two partial receptacle spaces that can be formed by means of the partition. In contrast to known devices, in which only the size of the always existing partial receptacle spaces can be varied, the flexibility for the user is broadened many times over. For example, the user can decide whether small utensils should be accommodated in a separate partial area of the receptacle space or the entire receptacle space should be used for larger utensils because the partition is able to move in a position that does not conflict with this type of utilization.

In an embodiment, it may furthermore be advantageous if the partition features oblong reinforcing means that extend along the bearing axis and are realized in such a way that the torsional rigidity of the partition along the bearing axis is reduced. The torsional rigidity of the partition along the longitudinal axis therefore refers to the rigidity against bending moments, the bending moment vector of which essentially extends perpendicular to the bearing axis. In other words, these are bending moments that act upon the partition, for example, due to utensils such as beverage containers. This is achieved, for example, with a prospective tilting motion of such a container. The reinforcement of the partition by means of oblong reinforcing means therefore reduces the probability of undesirably releasing a large utensil that protrudes over the inner wall of the receptacle device from this receptacle device. This partial receptacle space consequently is stabilized in such a way that the operational capability of the storage device is broadened even further.

It may also be advantageous if the above-described reinforcing means feature pins that are at least partially connected to a material of the partition that forms an elastic matrix by at least sectionally injection-moulding this material around the pins. This represents a particularly advantageous embodiment because it can be very easily manufactured. An elastic matrix may comprises, for example, a thermoplastic material and can be manufactured in a simple mould, particularly injection moulding tools. The previous insertion of the pin-shaped reinforcing means makes it possible to easily injection-mould the elastic material around the pins and consequently to connect the elastic matrix to the pins in a positively fitted and therefore also frictionally engaged fashion. In this respect, it is irrelevant if the elastic matrix is completely or only partially injection-moulded around the pins with respect to their circumferential direction. It may be advantageous, in particular, if the pins protrude from the elastic matrix over their entire extension along the bearing axis, for example, in order to achieve special optical effects or to reduce tensions on the contact surfaces between the pins and the elastic matrix to a minimum. The pins advantageously define a separate longitudinal axis that extends along the bearing axis in this case.

It is furthermore advantageous if a triggering device is provided in the region of the inner wall of an inventive storage device which the partition at least sectionally adjoins in the first stable deformation state, wherein said triggering device is realized such that the partition is deflected or can be deflected from the first stable deformation state to such a degree that the partition automatically seeks to assume the second stable deformation state when the triggering device is actuated. As already mentioned above, the elastic material of the panel-shaped partition concerns a material and a geometry with stable and unstable deformation states. The unstable deformation states are characterized in that the partition should be moved into a stable deformation state by means of tensions, i.e., stresses within the material of the partition. The mechanism of the triggering device serves for moving at least part of the partition into a position that suffices for causing the partition to seek assuming the opposite stable deformation state. The movement is advantageously carried out to such an extent that the partition is prevented from snapping back into the initial position, i.e., into the first stable deformation state. In this case, the triggering device can be designed in a very simple fashion and realized, for example, in the form of a depression in the inner wall of the receptacle device such that a user can reach in with one finger and move the partition into the desired position. However, it would also be possible to provide simpler or more complex mechanical designs such as, for example, rotary slides or slide controls in order to move the partition into the desired position with sliding lugs.

A partition for use in a storage device according to the present invention forms another object of the present invention. Such a partition has the advantage, in particular, that already existing storage devices can also be provided with the functionality according to the present invention. In inventive storage devices that have been used over a certain period of time, the inventive partition can be replaced such that the partition in a manner of speaking represents an expendable part that, however, has a significantly longer service life than it is the case with known partitions and in known storage devices due to the present invention.

BRIEF DESCRIPTION OF THE DRAWINGS

The present invention is described in greater detail below with reference to the attached drawings. The terms "left," "right," "top" and "bottom" used in this description refer to an orientation of the figures with normally legible reference symbols. In the drawings:

FIG. 3a shows a top view of another embodiment of a storage device with two partitions, FIG. 3b shows a top view of the storage device according to FIG. 3a with a partition in a different stable deformation state, FIG. 3c shows a top view of the storage device according to FIGS. 3a and 3b with both partitions in different deformation states, FIG. 4a shows a top view of a detail of the storage device according to FIGS. 3a to 3c, FIG. 4b shows a top view of the detail according to FIG. 4a with the released longitudinal edge of the partition, FIG. 8 shows a cross-sectional view of the overload safety according to FIG. 7 in the released state, FIG. 9a shows a cross-sectional view of another embodiment of an inventive overload safety, FIG. 9b shows a cross-sectional view of the overload safety according to FIG. 9a in the released state, FIG. 10a shows a cross-sectional view of another embodiment of an inventive overload safety, FIG. 10b shows a cross-sectional view of the overload safety according to FIG. 10a in the released state, FIG. 11 shows a cross-sectional view of another embodiment of an inventive overload safety, FIG. 13a shows a cross-sectional view of another embodiment of an inventive partition, FIG. 13b shows a cross-sectional view of another embodiment of an inventive partition, FIG. 14 shows an isometric view of another embodiment of an inventive partition, and FIG. 15 shows a cross-sectional view of another embodiment of an inventive partition.

DETAILED DESCRIPTION

Figure 1:
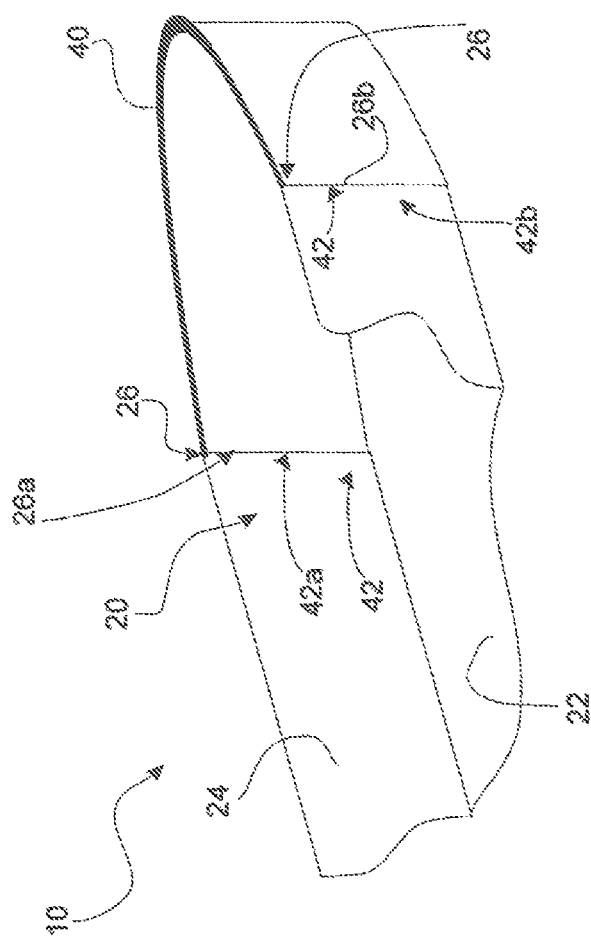
FIG. 1 shows an isometric view of a first embodiment of an inventive storage device.
Figure 2:
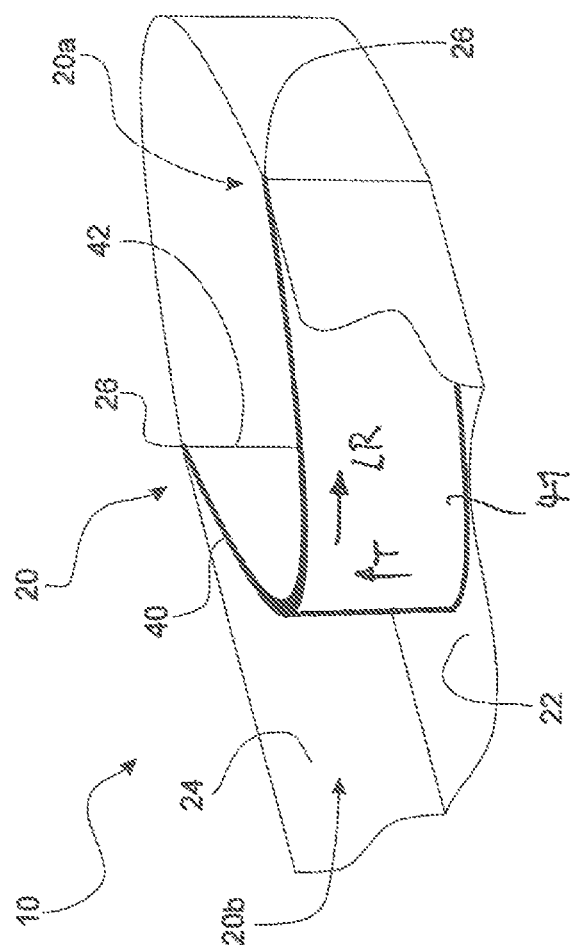
FIG. 2 shows an isometric view of the storage device according to FIG. 1 with a partition in the second stable deformation state.

The basic functionality of an inventive storage device 10 or receptacle device is briefly described below with reference to FIGS. 1 and 2. FIGS. 1 and 2 show a partition 40 that is supported in an articulated or non-articulated fashion in oppositely positioned bearing devices with its lateral edge sections and extends between the lateral edge sections in a longitudinal direction LR, wherein said partition is respectively illustrated in two different stable deformation states in these figures. The first stable deformation state is illustrated in FIG. 1 and the second stable deformation state is illustrated in FIG. 2. The stability of the deformation states results from the overall elasticity of the partition, i.e., in the form of a wall or panel extending between the lateral edge sections that, if the partition has a length L and the partition is supported or held in bearing devices that are spaced apart from one another by a distance that is smaller than the length L, particularly at least 10% smaller than the length L, on the one hand yields in the two directions illustrated in FIGS. 1 and 2 and therefore cannot assume the shape of a plane panel, but rather only curved deformation states. The overall panel has an elasticity, at which these deformation states are stable. In these deformation states, in particular, curvature profiles that have no inflection point, i.e., no change of curvature, and therefore represent uniform curvature profiles are respectively formed in the longitudinal direction LR of the partition.

The storage device 10 features a receptacle space 20 or storage space that is defined by a bottom surface 22 and an inner wall 24 with at least one lateral receptacle space surface. The bottom surface 22, as well as the inner wall 24, is illustrated in a cut-out fashion in this case in order to provide a better view of the partition 40. In FIG. 1, the partition 40 is arranged in such a way that it extends through the receptacle space 20 between two bearing devices or receptacle devices 26a, 26b that essentially are oppositely positioned on or realized in the inner wall 24. In the embodiment shown, the receptacle devices 26a, 26b are positioned on two sections of the inner wall 26 that face one another and generally extend angular to one another. The partition 40 as a whole is realized elastically and features two oppositely positioned lateral edge sections 42a, 42b that are realized in the form of reinforced bearing axes A such that the partition 40 can assume at least two stable deformation states with at least sectionally opposing curvature profiles when the lateral edge sections 42a, 42b are inserted into bearing devices 26a, 26b of the inner wall 24 of a storage device 10 in order to divide a receptacle space 20 of the storage device 10. The lateral edge sections 42a, 42b are also generally identified by the reference symbol 26 in the figures.

Due to the design in a first stable deformation state, the partition 40 essentially abuts on the inner wall 24 with its entire surface. Due to the abutment over the entire surface, the partition 24 in other words is in the first stable deformation state in a position, in which nearly the entire receptacle space 20 is available for accommodating utensils. However, the partition 40 and the inner wall 24 of the storage device may generally also be designed such that the partition 40 is spaced apart from the inner wall 26 in both deformation states.

The bearing devices that are also generally identified by the reference symbol 26 below extend from the bottom surface 22 and along the inner wall 24 up to its upper end. The partition 40 therefore extends from the bottom surface 22 up to the upper end of the inner wall 24. If the partition 40 is now moved out of the first position illustrated in FIG. 1, i.e., out of the first stable deformation state, it is moved through a plurality of intermediate positions that respectively are unstable deformation states of the partition 40 due to its elasticity. These unstable deformation states originate from clamping forces in the bearing devices 26 on the inner wall 24, as well as from elastic restoring forces generated in the material of the partition 40. Depending on the position of the elastic partition 40, this partition 40 therefore seeks to assume one or the other stable deformation state from the unstable deformation states. As soon as the movement of the partition 40 from the position illustrated in FIG. 1 exceeds a minimum position between the two bearing devices 26, the partition 40 seeks to assume the second stable deformation state, i.e., the position illustrated in FIG. 2. FIG. 2 shows the final state of this movement, i.e., the partition 40 in the second stable deformation state. In this position, the partition 40 divides the receptacle space 20 into two partial receptacle spaces 20a and 20b. In this case, the partial receptacle space 20a is positioned between the partition 40 and the part of the inner wall 24, on which the partition 40 abuts in the first stable deformation state as illustrated in FIG. 1. In this position, small utensils, as well as beverage containers, can be accommodated in the partial receptacle space 20a between the partition 40 and the corresponding inner wall 24. The overall elasticity of the partition therefore is realized in such a way that the partition as a whole has a sufficient inherent stability in the two stable deformation states.

Although not yet illustrated in greater detail in FIGS. 1 and 2, at least one overload safety device is provided in the storage device 10 as described below with reference to different exemplary embodiments in order to prevent the partition 40 from being damaged or even completely destroyed. The overload safeties 50 are realized, in particular, in connection with the bearing devices 26 and the longitudinal edges 42 of the partition 40. This type of overload safeties 50 according to the present invention is described in greater detail further below.

FIGS. 3a to 3c show another embodiment of the present invention, wherein this storage device 10 features a receptacle space 20, in which two partitions 40 are arranged. This further elucidates the flexibility of use of an inventive storage device 10. For example, it is possible to divide a single large receptacle space 20 of the type illustrated in FIG. 3a into two partial receptacle spaces 20a and 20b as illustrated in FIG. 3b, as well as into three partial receptacle spaces 20a, 20b as illustrated in FIG. 3c. Partial receptacle spaces 20a according to FIG. 3a may also have an identical, i.e. symmetrical, arrangement and geometric design. The extension of the partitions 40 from a retracted first deformation state that is illustrated for both partitions 40 in FIG. 3a into the extended second deformation state that is illustrated for both partitions 40 in FIG. 3c therefore creates a flexibility of use for the user who can freely choose between one large receptacle space 20 according to FIG. 3a, one medium-sized receptacle space 20b and one small receptacle space 20a as illustrated in FIG. 3b or three small receptacle spaces 20a and 20b as illustrated in FIG. 3c.

FIGS. 3a to 3c also show that the bearing devices 26 comprise bearing devices 26 that allow an articulated support of the longitudinal edges 42. In comparison with the utilization of fixed bearings as bearing devices 26, this provides the advantage that an articulation of up to 180° about the bearing axis A can be realized. This makes it possible to even better utilize the receptacle space 20 or the partial receptacle spaces 20a and 20b, respectively. In contrast to a fixed support, the partition 40 extends in the articulated support in the form of a tangent on the inner wall 22 in the vicinity thereof while the partition essentially extends away from the inner wall perpendicularly in a fixed support. In a fixed support, this edge region therefore is unusable or at least only usable to a limited degree.

Since the user of an inventive storage device 10 usually will frequently change between the individual configurations and these changes are associated with a relatively high stress on the partition 40 and the bearing devices 26, the present invention proposes to provide at least one overload safety 50, the function of which is briefly described below with reference to FIGS. 4a and 4b.

FIG. 4a shows an enlarged detail of the embodiment according to FIGS. 3a to 3c. The partition 40 is illustrated in the second stable deformation state, i.e., in the extended state, in FIG. 4a. In this case, the partition 40 extends between the inner wall 24 between the two bearing devices 26 that essentially are oppositely positioned. On the upper side of the illustration in FIG. 4a, an overload safety 50 is partially realized integrally with the bearing device 26 as elucidated in greater detail below with reference to the following embodiments. If the partition 40 is now moved into the position illustrated in FIG. 4a, the partition 40 stops in the second deformation state at the end of this movement in accordance with the state illustrated in FIG. 4a. The stop, i.e., the deceleration of the movement of the partition 40, is absorbed by forces in the material of the partition 40 that in turn are supported in the bearing devices 26. If these forces exceed the material stability of the partition 40, changes to the material, particularly the material structure, can occur such that the material is weakened and the permanent stability under loads of the partition 40 is reduced many times over. It is also conceivable that not only a structural change occurs starting at a certain force, but also ripping or complete tearing of the partition 40 such that the partition is rendered unusable together with the entire storage device 10.

This is prevented by providing the overload safety 50 that intervenes in order to create a situation of the type illustrated in FIG. 4b. In this case, the longitudinal edge 42 that is not illustrated in greater detail in FIG. 4b is released from the overload safety 50 and therefore also from the bearing device 26 such that the stresses in the partition 40 can be relieved and no stress concentrations or force peaks can lead to structural changes in the material or to tears and damages or the destruction of the partition 40. The overload safety 50 therefore protects the functionality of the material of the partition 40 such that the partition also remains functional and can be reinserted into the respective bearing device if excessively high stresses occur.

Figure 5:
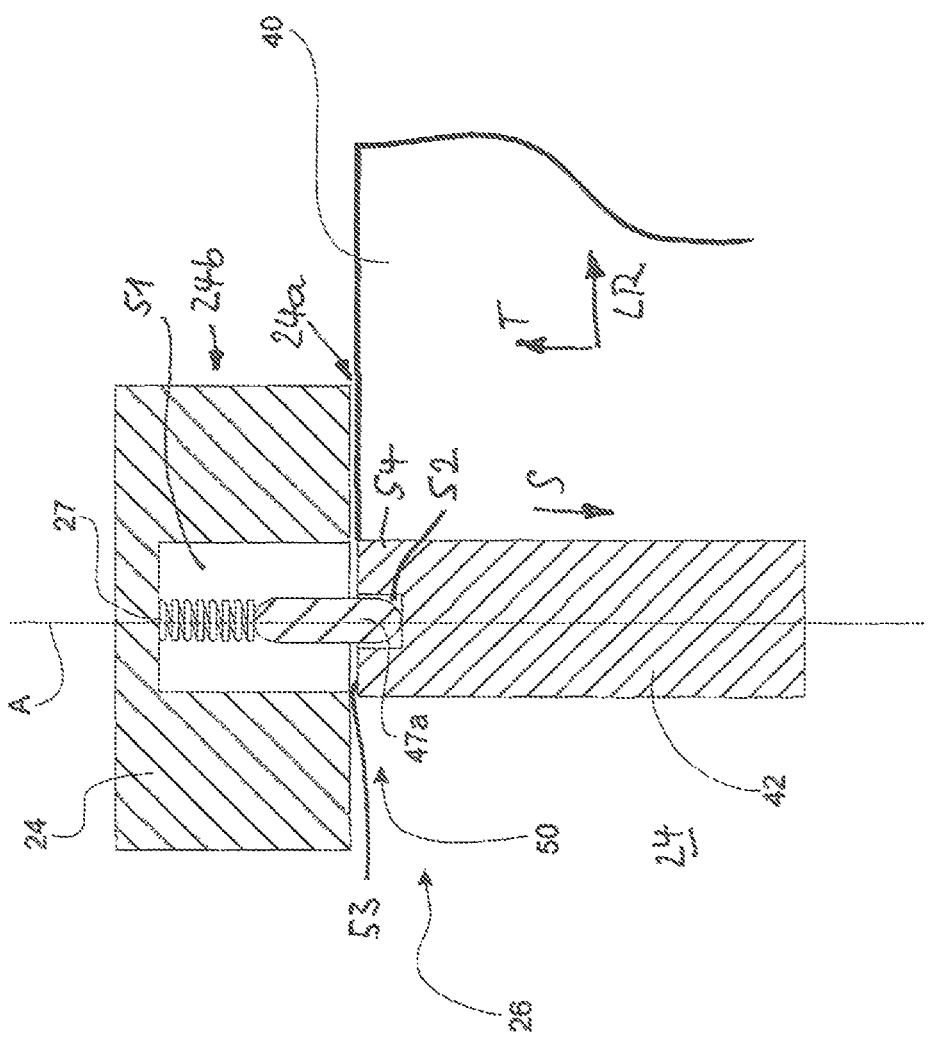
FIG. 5 shows a cross-sectional view of an embodiment of an inventive overload safety.
Figure 6:
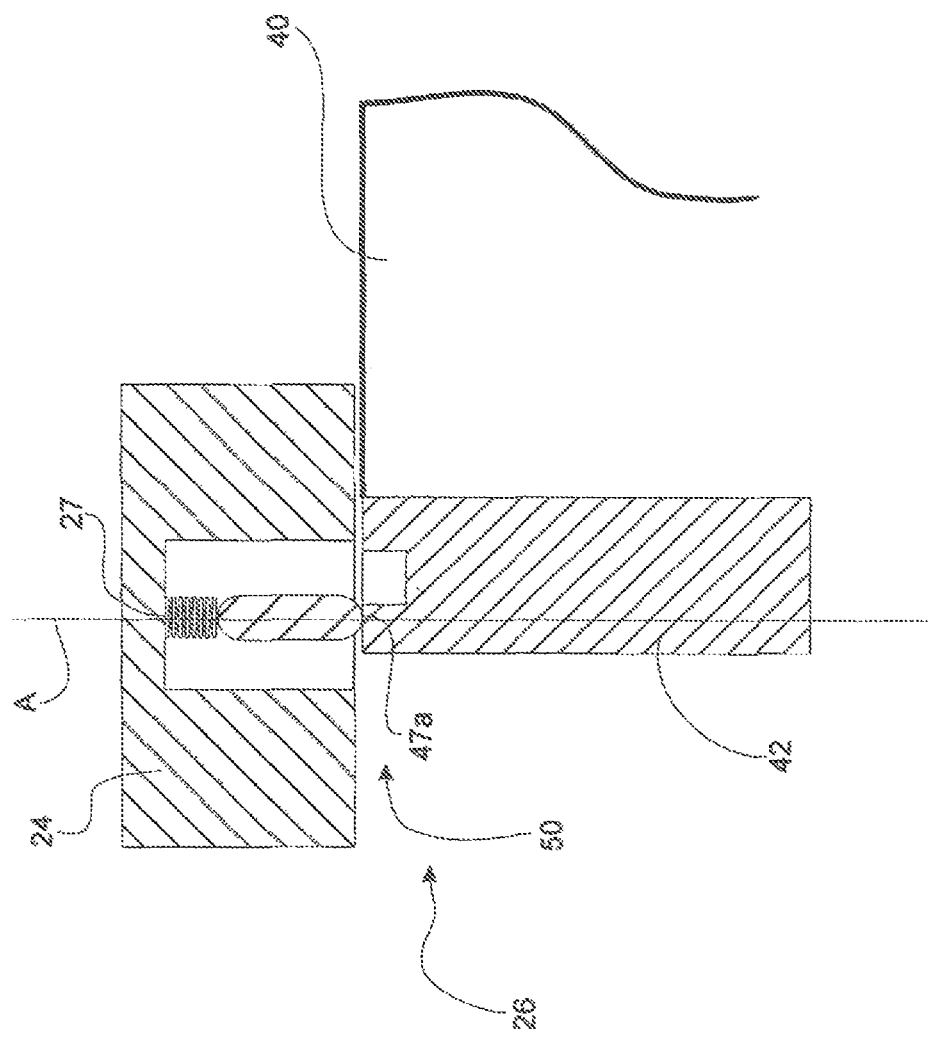
FIG. 6 shows a cross-sectional view of the overload safety according to FIG. 5 in the released state.

FIGS. 5 and 6 show a first embodiment of an overload safety 50 according to the present invention. In this case, the overload safety 50 may be provided, in particular, in the inner wall 24. Each of the bearing devices 26 is realized in such a way that a side wall section 42 is respectively supported or held relative to the inner wall 26 in an articulated or non-articulated fashion. In the embodiment according to FIG. 5, the overload safety simultaneously serves for supporting the respective edge section 42.

One embodiment of the overload safety 50 features a catch element 47a that can be moved between a catch position and a release position by means of a prestressing device and is prestressed into the catch position in such a way that the catch element can in its catch position be at least partially inserted into a recess 52 or depression of the partition 40 that is realized on the upper side 53 of the end section 54 that is directed outward in the axial direction A of the lateral edge section 42 of the partition 40 from the inner region thereof and faces the recess 51 in the inserted state of the partition 40. In order to insert the partition, the inner wall may, as illustrated in FIG. 5, be provided with a depression 24a that can accommodate a lateral edge section 42 realized in the form of a reinforced bearing axis and features an in its installed state upper bearing section 24b referred to the direction of the gravitational force and the storage device, wherein said bearing section protrudes over the depression 24a in the horizontal direction and therefore is provided as abutment for the upper side 53. The bottom section of the storage device features a bearing section 24b that lies opposite of the bearing section 24b referred to the direction of the gravitational force such that the lateral edge section 42 can be supported and held between the sections 24b and 24c.

According to one embodiment, the prestressing device may feature at least one spring element 27 that is inserted into the receptacle device and optionally a catch element 47a that is guided and can be moved in the recess 51, wherein said catch element can be moved between a catch position and a release position against the spring force of the spring element 27 and is prestressed into the catch position in such a way that the catch element can in its catch position be at least partially inserted into a receptacle 52 in a lateral edge section 42 of the partition 40 and supports the lateral edge section 42 in an articulated fashion in the engaged state of the catch element 47a, and wherein said catch element can release the lateral edge section 42 from the respective section of the inner wall when a defined value of a transverse force that acts upon the lateral edge section in a direction extending transverse to the direction S of the gravitational force or the axial direction A is exceeded. The prestressing device may also be realized without a catch element 47a.

In the embodiment according to FIG. 5, the prestressing device features a spring element 27 that comprises two parts. On the one hand, the spring element 27 is provided with a coil spring, the axis of which defines the direction of the spring force and is aligned along the bearing axis A of the bearing device 26. On the other hand, the spring element 27 features a pin or a lug-shaped means or projection that can engage into the depression 52 in the lateral edge section 42 of the partition 40 as a first catch element 47a. FIGS. 5 and 6 also show that the partition 40 features a variation of the longitudinal edge 42 that is realized separately of the main extension of the partition 40. The cross section of the longitudinal edge 42 illustrated in the sectional representations according to FIGS. 5 and 6 is advantageously realized in the form of a round cross section.

FIG. 5 shows the secured state of the overload safety 50 of the partition 10. This means that the spring element 27 is inserted into the depression of the first catch element 47a of the longitudinal edge 42 of the partition 40. This prevents a movement of the partition 40, particularly of the longitudinal edge 42, transverse to the bearing axes A and also prevents a release of the longitudinal edge 42. The spring element 27 simultaneously serves for forming the bearing device 26. For example, the lug-shaped extension of the spring element 27 which protrudes into the depression of the first catch element 47a serves for axially supporting the longitudinal edge 42 along the bearing axis A. In this case, the bearing axis A and the axis of the spring force of the spring element 27 advantageously extend coaxial to one another. In other words, the securing force of the spring element 27 simultaneously exerts the required bearing force of the bearing element 26 upon the longitudinal edge 42 such that the bearing element 26 and the overload safety 50 are essentially realized integrally with one another.

FIG. 6 shows the embodiment according to FIG. 5, however, in the released state. The function of such an overload safety 50 is described below with reference to this situation. If the force that pulls on the longitudinal edge 42 in the partition 40, i.e., the force that tends to pull the longitudinal edge 42 out of the bearing device 26, is so high that it exceeds a predefined value of a bearing force, the spring element 27, particularly its lug-shaped extension, slides out of the depression of the first catch element 47a of the longitudinal edge 42 along its rounded edges. This releases the longitudinal edge 42 such that it can move away from the bearing axis A as illustrated in the situation in FIG. 6. The bearing edge 42 and therefore the entire partition 40 consequently are released from the bearing device 26 such that potential stresses can no longer be supported in the bearing device 26 and the partition 40 moves in the direction of a new equilibrium of forces, in which the values, in particular, of material tensions, i.e., forces in the material of the partition 40, are virtually zero. A structural change in the material of the partition 40, as well as the formation of tears or the destruction of the partition 40 or the longitudinal edge 42, is avoided by thusly preventing an overload by means of the overload safety 50.

The preceding description makes it clear that the function of the overload safety 50 is particularly simple in this embodiment because the predefined bearing force can be adjusted by means of the spring force. Regardless of constructive changes to individual components, different predefined bearing forces that define the release force of the overload safety 50 can be adjusted in dependence on the degree of hardness of the spring. Consequently, it is possible to utilize one and the same constructive device for various materials and geometries of receptacle devices 10 or partitions 40, respectively. In this way, the flexibility of use of such partitions 40 or such receptacle devices 10 is increased many times over.

Figure 7:
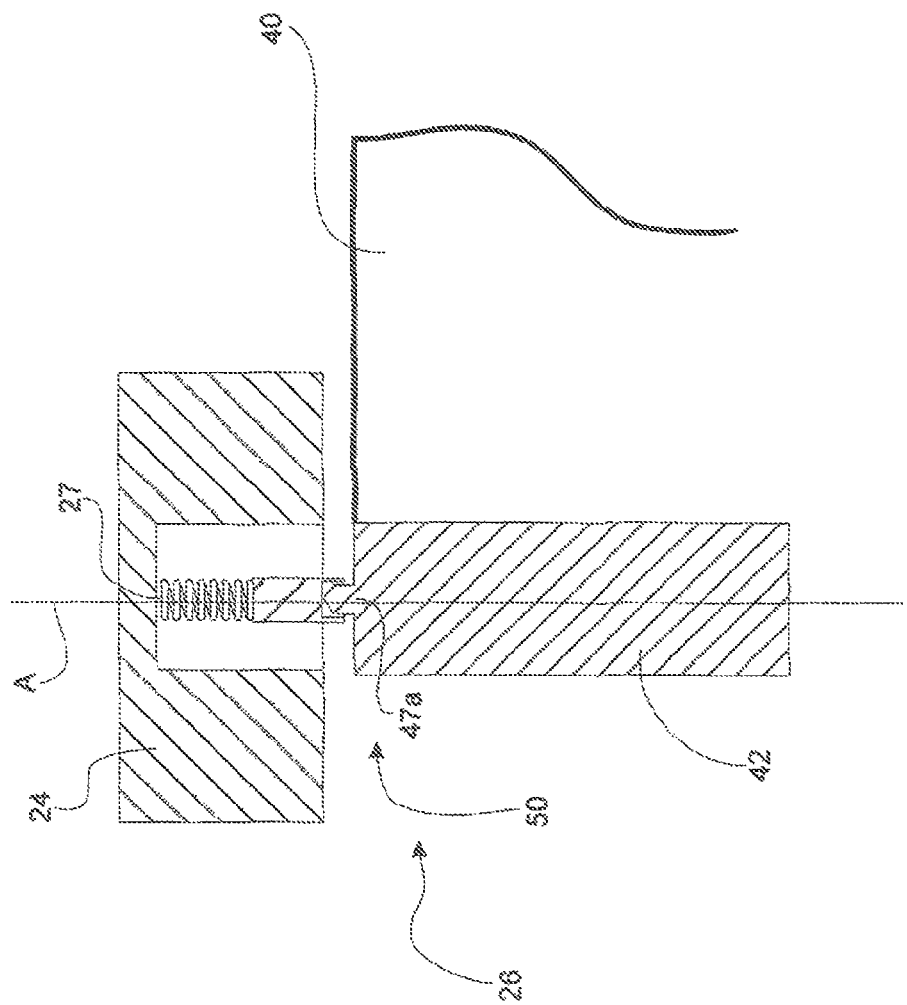
FIG. 7 shows a cross-sectional view of another embodiment of an inventive overload safety.

FIGS. 7 and 8 are essentially identical to FIGS. 5 and 6, but the functions of the spring element 27 and of the first catch element 47a are reversed in the embodiment illustrated in these two figures. With respect to the spring element 27, this concerns a correlation between a coil spring that is arranged in the inner wall 24 and an extension with a depression. The first catch element 47a in the form of a lug is accommodated in this depression, wherein rounded edges of the extension of the first catch element 47*a* in this case also ensure that the spring element 27 can be more easily disengaged or pushed back along the bearing axis A against the spring force. The function of the overload safety 50 and the release of the longitudinal axis 42 are identical to the preceding description with reference to FIGS. 5 and 6.

FIGS. 9*a* and 9*b* show another embodiment of an inventive overload safety 50. In this case, FIG. 9*a* also shows the secured position and FIG. 9*b* shows the release position of the longitudinal edge 42.

FIG. 9*a* shows the secured position of the overload safety 50. In this case, the overload safety is realized by means of a spring element 47 that comprises a corresponding coil spring and a spherical element. The spherical element protrudes into a depression of a first catch element 47*a* on the upper end of the longitudinal edge 42 of the partition 40 and therefore secures the partition. In order to form an abutment for the spring force of the spring element 27, a second catch element 47*b* that is also realized in the form of a depression is provided on the longitudinal edge 42 on the underside of the bearing device 26. This depression corresponds to a lug-shaped extension of the material of the inner wall 24. After the insertion into the position according to FIG. 9*a*, the spring force of the spring element 27 in a manner of speaking presses the sphere into the depression of the first catch element 47*a*, wherein the spring element extends along the bearing axis A up to the lower end and therefore up to the depression of the second catch element 47*b* on the lower end of the longitudinal edge and is supported on the lug-shaped extension of the inner wall 24. Consequently, the lug-shaped extension on the inner wall 24 forms an abutment for the spring force or for the bearing force, respectively. The release function is essentially identical to those described above with reference to FIGS. 5 to 8, but the bearing edge 42 is tilted in this case due to the design of the abutment in the form of a second catch element 47*b*. It is therefore not necessary to provide the overload safety 50 on the upper and on the lower end, but it rather suffices to arrange a single overload safety 50 on one end of the longitudinal edge 42. Due to the release on one end of the longitudinal edge 42 in accordance with the illustration in FIG. 9*b*, the partition 40, particularly the longitudinal edge 42, is able to tilt and the longitudinal edge 42 can upwardly separate from the lug-shaped extension of the inner wall 24. In this way, the entire longitudinal edge 42 is released and the number of components and therefore the complexity of the overload safety 50, as well as of the bearing device 26 realized integrally therewith, are simultaneously reduced to a minimum.

FIGS. 10*a* and 10*b* show another embodiment of an inventive storage device 10, wherein the function of the overload safety 50 is essentially identical to the function of the overload safety 50 according to the embodiments in FIGS. 5 to 9*b*. However, the respective bearing force or overload force is redirected in this case. This makes it possible to realize the spring element 27 in the form of a spiral spring. The spiral spring is supported in a receptacle that is arranged in the inner wall 24 to the left of the longitudinal edge 42 of the partition 40. Due to a bend of 180°, a lug in the form of a catch extension extends into the region of the inner wall 24 provided for the bearing device 26. A lug-shaped extension on the spring element 27 engages into a depression of a first catch element 47*a* on the upper end of the longitudinal edge 42 of the partition 40. A catch extension of the inner wall 24 is provided on the lower end of the longitudinal edge 42 analogous to FIGS. 9*a* and 9*b* and engages into a depression of the catch element 47*b* of the longitudinal edge 42 of the partition 40. The release takes place in the same fashion as described above with reference to FIGS. 9*a* and 9*b*. The advantage of such an embodiment is the redirection of the spring force that respectively serves as bearing force or overload force of the bearing device 26 or the overload safety 50. In comparison with FIGS. 9*a* and 9*b*, no structural height is required above the longitudinal edge 42. In fact, the entire spring force of the overload safety is supported to the left of the longitudinal edge 42 of the partition 40 due to the redirection. The entire system of the storage device 10 therefore can be realized in a much more compact fashion, wherein the partition 40 and its longitudinal edge 42 can, in particular, extend much further upward such that the difference in height between the inner wall 24 and the partition 40 is reduced to a minimum.

FIG. 11 shows another embodiment of an inventive overload safety. This figure shows a cross section that essentially extends along the bearing axis A of the bearing device 26. The bearing device 26 is realized integrally with the inner wall 24 in this case. It essentially comprises a bore with an essentially rectangular cross section and rounded corners. The longitudinal edge 42 of the partition 40 is accommodated in this bore and extends along the not-shown bearing axis A extending perpendicular to the plane of projection in FIG. 11. In this case, a section of the inner wall 24 that extends in the direction of the partition 40, i.e., downward in FIG. 11, becomes thinner and thinner such that a spring element 27 is formed due to the reduction of the material thickness. The spring effect of the spring element 20 is defined by the material characteristic, i.e., the restoring force of the material of the inner wall 24, on the one hand and by the dependence on the corresponding material thickness on the other hand. This makes it possible to adjust a spring force that suffices for holding the longitudinal edge 42 of the partition 40 in the required position as long as the partition 40 is operated normally. The force used for the retention in the bearing device 26 simultaneously also serves as a spring element 27 of an overload safety 50. Consequently, parts of the longitudinal edge 42 act along its circumferential direction and abut on the spring element 27 in the form of first catch element 47*a*. These catch elements bend the spring elements 27 outward such that the longitudinal edge 42 can be completely released. An embodiment of the type illustrated in FIG. 11 may in this case be realized over the entire axial extension of the longitudinal edge 42 along the bearing axis A or only sectionally.

Figure 12:
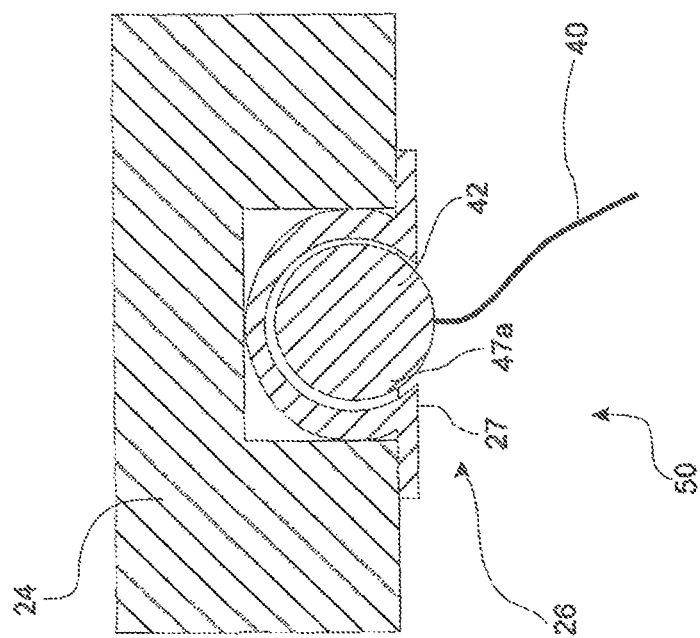
FIG. 12 shows a cross-sectional view of another embodiment of an inventive overload safety.

FIG. 12 shows another embodiment of an inventive overload safety that is realized similar to the overload safety described above with reference to FIG. 11. In contrast to FIG. 11, however, the spring element 26 is not realized with the material of the inner wall 24 in this embodiment, but a clip is provided that essentially has a cross section in the shape of the Greek letter omega. In this case, the edges of the clip of the overload safety 50 that are directed toward the opening of the omega-shaped clip act as spring elements 27 and the corresponding contact sections of the longitudinal edge 42 of the partition 40 act as corresponding first catch elements 47*a*. The omega-shaped overload safety component, i.e., the spring elements 27, is also bent open in this case such that the longitudinal edge 42 of the partition 40 can be completely released.

The embodiment according to FIG. 12 can be modified as illustrated in FIG. 15. A clip in the shape of the letter omega is also shown in this figure. This clip is accommodated within a depression in the inner wall 24 and supported relative to this depression in the interior thereof with its two limbs. When the partition 40 exerts tension upon the longitudinal edge 42, the two limbs of the clip are pushed to the left and to the right along these surfaces. This not only increases the inside diameter of the omega-shaped clip, but also the opening that blocks the movement of the longitudinal edge 42 out of the clip. If the stress in the partition 40 exceeds a predefined bearing force, the opening of the clip is so large that the longitudinal edge 42 can no longer be held therein and therefore is released. The clip subsequently snaps back into its initial position such that it can be reused as overload safety after the longitudinal edge 42 has been reinserted therein. In this embodiment, the overload safety 50 also simultaneously acts as bearing device 26 for the longitudinal edge 42 of the partition 40. Parts of the clip in the limbs of the omega also have the functionality of a spring element 27 and parts of the longitudinal edge 42 have the functionality of a first catch element 47a.

FIGS. 13a and 13b show two embodiments of an inventive partition 40. They serve as reinforcement against torsional moments, i.e., bending moments, the vector of which is aligned along the longitudinal direction L of the partition 40 or essentially perpendicular to the longitudinal edge 42 or the bearing axis A, respectively. This is achieved with pins 62 of reinforcing means 60 that essentially extend along the bearing axis A that is not illustrated in FIGS. 13a and 13b within a matrix 64 of the partition 40. The matrix 64 of the partition 40 comprises an elastic material that, with respect to its material components and with respect to the required flexural rigidity, can be much easier adapted to the required restoring forces and restoring moments about a moment axis extending along the depth direction T in order to be deformed into the two stable deformation states. The depth direction T may by definition be the axial direction A that is defined by the shape of the lateral edge section 42 and the bearing devices. The deformation states of the partition 40 are purposefully stabilized against undesirable torsions or flexures by means of the reinforcing means 60. In this case, it would be possible to completely injection-mould around the reinforcing means 60, particularly the pins 62, such that they are completely accommodated in the interior of the partition 40 as illustrated in FIG. 13a. This may be advantageous with respect to the utilization of less expensive materials such as, for example, non-stainless steels for the pins 62 because corrosion is prevented due to the lack of contact with the environment.

It would generally be possible, in particular, that the partition 40 features at least one flexurally rigid carrier matrix reinforcing device 60 that is realized in the form of longitudinal profiles 61 on or through the carrier matrix 80 which extend transverse to the longitudinal direction L of the partition 40. The longitudinal profiles extend in the depth direction of the partition 40. Viewed in the longitudinal direction L, connecting regions 80a of the carrier matrix 80 are positioned between adjacent longitudinal profiles 61 and connect the longitudinal profiles to one another and/or jointly form a base plate of the partition 40 that extends between and connects the lateral edge sections 42a, 42b. The longitudinal profiles increase the flexural rigidity of the partition 40 against bending moments, the moment axis of which extends transverse to the axial directions of the bearing axes A, in comparison with the flexural rigidity of the carrier matrix 80 without longitudinal profiles. In order to realize an elasticity of the partition, at which a deformation thereof generates restoring moments suitable for the stabilization of the stable deformation states about a moment axis extending in the depth direction T of the partition 40, the connecting regions 80a comprises a suitable material with adequate elasticity and are realized, in particular, with a suitable thickness. The restorability of the partition and the stabilization of the stable deformation states in the inserted state thereof may result, in particular, from the elasticity of the connecting regions only because the longitudinal reinforcing profiles are unable or only barely able to curve about a curvature axis extending in the depth direction.

The embodiment according to FIG. 13b essentially is very similar to the embodiment according to FIG. 13a, but the pins 62 have an essentially elliptical cross section in this case. These elliptical cross sections additionally reinforce the partition 40 along the transverse direction, i.e., essentially perpendicular to the bearing axis A. In this way, the extensibility and therefore the destabilization of the stable deformation states are additionally reduced. Furthermore, the pins 62 protrude from the interior of the matrix 64 of the partition 40 such that materials of higher quality are required in this case. However, this protrusion creates an optical structure of technical nature and makes it possible to achieve an overall appearance of an inventive receptacle device 10, particularly an inventive partition 40, that is perceived as highly aesthetic by the user.

FIG. 14 shows a schematic isometric view of the two embodiments in FIGS. 13a and 13b. This figure clearly shows that the pins 62 of the reinforcing means 60 extend along the bearing axis A.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A storage device comprising:
  a bottom surface and an inner wall that forms a receptacle space together with said bottom surface;
  at least two bearing devices arranged in the inner wall;
  at least one panel-shaped and elastic partition extending along a longitudinal direction (LR) and a width direction that is transverse to the longitudinal direction (LR), wherein the partition comprises two oppositely positioned lateral edge sections having outer ends that are defined extending in the width direction of the partition each coupled to a respective bearing device of the inner wall such that a bearing axis (A) is formed in the width direction of the partition, wherein a position of the bearing devices is chosen and the partition is realized in such a way that the partition can assume at least two stable deformation states with at least sectionally opposing curvature profiles along the longitudinal direction (LR) of the partition in order to divide the receptacle space of the storage device into partial receptacle spaces; and
  at least one overload safety for the arrangement of the partition in the storage device, wherein the overload safety is realized in such a way that it completely releases at least one of the lateral edge sections from the corresponding bearing device to disengage the one of the lateral edge sections from the corresponding bearing device when the partition exerts at least a predefined force upon at least one bearing device transverse to the bearing axis (A) and in a direction away from the respective bearing device and away from the inner wall into the receptacle space.

2. The storage device according to claim 1, wherein the overload safety is realized in such a way that an overload of the material of the partition is prevented at the beginning, during or at the end of the movement of the partition between the first stable deformation state and the second stable deformation state.

3. The storage device according to claim 1, wherein the overload safety is at least partially formed by at least one of the bearing devices and one correspondingly designed longitudinal edge of the partition.

4. The storage device according to claim 1, wherein at least one bearing device features at least one spring element that can be moved against a spring force and corresponds to a catch element of the longitudinal edge of the partition in such a way that the catch element is in the engaged state thereof held in the bearing device in an articulated fashion by the spring element and the spring element is moved against the spring force such that the catch element is released when the predefined force is exerted upon the at least one bearing device transverse to the bearing axis (A) to cause a defined bearing force to be exceeded such that the longitudinal edge of the partition is released and can freely move away from the at least one bearing device thereby completely releasing the at least one of the lateral edge sections from the at least one bearing device.

5. The storage device according to claim 4, wherein the overload safety features a first catch element that corresponds to the spring element of the overload safety on one end of at least one longitudinal edge of the partition referred to the longitudinal axis (A) and a second catch element that corresponds to an abutment in the form of a corresponding catch mechanism of the bearing device on its other end such that the second catch element is also automatically released during the release of the first catch element and therefore the entire longitudinal edge of the partition is released.

6. The storage device according to claim 4, wherein the spring element can be displaced along the longitudinal axis (A) against a spring force.

7. The storage device according to claim 4, wherein the spring element can be moved perpendicular to the bearing axis (A) against a spring force.

8. The storage device according to claim 4, wherein at least one of the bearing devices and the overload safety are at least partially realized integrally.

9. The storage device according to claim 4, wherein the partition at least sectionally adjoins the inner wall in the first stable deformation state.

10. The storage device according to claim 4, wherein the partition features oblong reinforcing means that extend along the bearing axis (A) and are realized in such a way that the torsional rigidity of the partition along the bearing axis (A) is reduced.

11. The storage device according to claim 10, wherein the reinforcing means feature pins that are at least partially connected to a material of the partition that forms an elastic matrix by at least sectionally injection-moulding this material around the pins.

12. The storage device according to claim 10, wherein a triggering device is provided in the region of the inner wall which the partition at least sectionally adjoins in the first stable deformation state, wherein said triggering device is realized such that the partition is deflected or can be deflected from the first stable deformation state to such a degree that the partition automatically seeks to assume the second stable deformation state when the triggering device is actuated.

13. A partition for use in a storage device according to claim 1.

14. The storage device according to claim 4, wherein the at least one spring element, the catch, and the longitudinal edge of the partition are cooperatively configured such that the catch element is released when the predefined force is exerted upon the at least one bearing device transverse to the bearing axis (A) to cause the longitudinal edge of the partition to be non-destructively released from the at least one bearing device so that the partition can be reinserted back into the at least one bearing device.

* * * * *